J. A. SWINEHART.
RUBBER TIRE.
APPLICATION FILED JUNE 23, 1913.
1,234,821.
Patented July 31, 1917.
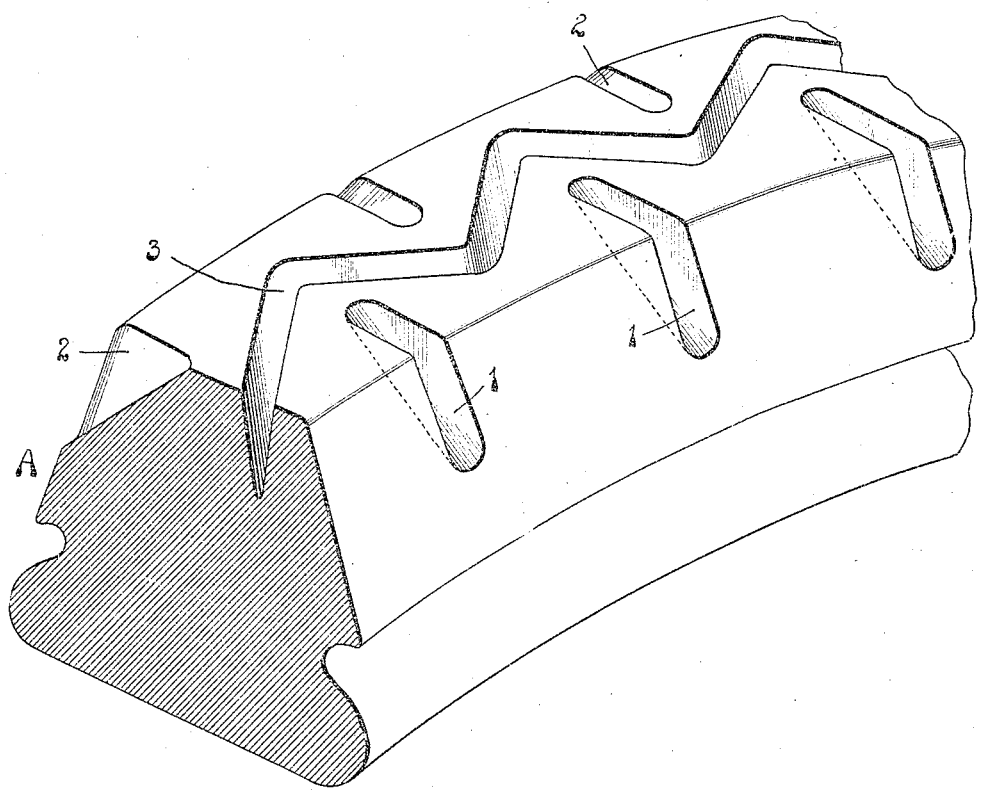
Attest
Inventor.
J. A. Swinehart
by
Att'ys.

UNITED STATES PATENT OFFICE.

JAMES A. SWINEHART, OF ST. LOUIS, MISSOURI.

RUBBER TIRE.

1,234,821.  Specification of Letters Patent.  Patented July 31, 1917.

Application filed June 23, 1913. Serial No. 775,265.

*To all whom it may concern:*

Be it known that I, JAMES A. SWINEHART, a citizen of the United States of America, residing at the city of St. Louis, in the State of Missouri, have invented certain new and useful Improvements in Rubber Tires, of which the following is a full, clear, and exact description, reference being had to the accompanying drawings, forming a part of this specification.

My invention relates to a rubber tire, and it has for its object to produce an improved construction of solid rubber tire so formed as to afford its resilience, and prevent skidding and slippage when the tire is moving upon a slippery roadway.

The drawing is a perspective view of a fragment of my tire.

A designates my tire, having outwardly converging sides and a flat tread as shown.

1 and 2 are corner recesses in the form of notches extending transversely of the tread and converging sides of the tire A at frequent intervals from opposite sides thereof. These corner recesses are open at the sides of the tire, and also at the tread of the tire, and preferably extend in the tire tread to a distance less than one-half of the width of such tread. The corner recesses at each side of the tire are staggered or offset relative to the corner recesses at the opposite side of the tire. By so forming the corner recesses, I weaken the tire at frequent intervals along its sides and at its tread adjacent its sides, and make it possible for the rubber between the recesses to be displaced circumferentially of the tire into such recesses, with resultant resiliency due to such displacement. It will also be apparent that, due to the recesses 1 and 2 being formed as shown and described, they receive wet material encountered by the tire upon a roadway, and discharge the material at the sides of the tire, thereby clearing a path for the tread surface of the tire back of the recesses.

It will be apparent, however, that if only the recesses 1 and 2 adjacent to the sides of the tire were present at the tread, the mid portion of the tire would present a smooth surface, which would slip upon a roadway. To obviate slippage of the mid portion of the tire tread, I provide in the tire tread a recess 3, which is in the form of a single continuous serpentine or zigzag angular groove extending circumferentially of the tire and located centrally between the sides of the periphery thereof. This angular groove being of serpentine or zigzag form extends first toward one side of the tire and then toward the opposite side of the tire. The groove is of V-shape, so that the dirt or wet material entering thereinto will readily escape therefrom.

When my tire is traveling over a wet or loose dirt roadway, the walls of the groove 3 extending diagonally of the tire tread act to wipe wet or slippery material from the roadway, and such groove being of sufficient capacity to receive the roadway material encountered at the mid portion of the tire tread, serves to gather the material so that the tread surface back of the groove walls will have a cleaned roadway surface to operate upon.

As a consequence of the side recesses 1 and 2 of my tire being staggered at each side of the tire relative to the recesses at the opposite side, and said side recesses being extended transversely of the tire tread toward the inner sides of the angles of the groove 3 leading toward the side of the tire opposite to that from which the side recesses extend, the side recesses overlap the zigzags or angles of the circumferential groove, and afford, with said circumferential groove, roadway cleaning recesses by which a path may be cleaned the entire width of the tire tread.

I claim:—

A solid rubber tire constructed with a single continuous serpentine, or zigzag, angular groove located in the tread of the tire, of V-shape in transverse section, extending circumferentially of the tire and located centrally between the sides of the tire and transverse corner recesses entering the angles of the angular groove from both sides of the tire so as to present a staggered arrangement.

J. A. SWINEHART.

In the presence of—
E. CLARK,
E. B. LINN.